United States Patent [19]

Flaig

[11] 3,977,490
[45] Aug. 31, 1976

[54] HEAT PROTECTION FOR A VEHICLE ACCUMULATOR
[75] Inventor: Manfred Flaig, Stuttgart, Germany
[73] Assignee: Daimler-Benz Aktiengesellschaft, Stuttgart, Germany
[22] Filed: Apr. 3, 1975
[21] Appl. No.: 564,919

[30] Foreign Application Priority Data
Apr. 6, 1974  Germany............................ 2416807

[52] U.S. Cl............................... 180/68.5; 180/64 A
[51] Int. Cl.² ........................................ B60R 18/02
[58] Field of Search.................... 180/68.5, 64 A

[56] References Cited
UNITED STATES PATENTS

| | | | |
|---|---|---|---|
| 1,867,802 | 7/1932 | Bogert | 180/64 A X |
| 2,104,770 | 1/1938 | Saunders | 180/68.5 |
| 2,104,773 | 1/1938 | Saunders | 180/68.5 |
| 2,717,045 | 9/1955 | Nallinger | 180/68.5 X |

*Primary Examiner*—M. H. Wood, Jr.
*Assistant Examiner*—Milton L. Smith
*Attorney, Agent, or Firm*—Craig & Antonelli

[57] ABSTRACT

A motor vehicle driven by an internal combustion engine which includes an electrical accumulator arranged in the engine space and an air pump for blowing-in air during the after-treatment of the engine gases; the accumulator is encapsulated on all sides by a protective housing leaving an intermediate air space with respect to the accumulator housing while two line connections are provided at the protective housing which are as far away from one another as possible in the flow direction; one line connection is connected with the suction side of the air pump while the other line connection is operatively connected with a protected place in the vehicle which during operation is at least approximately at the outside temperature.

13 Claims, 1 Drawing Figure

U.S. Patent   Aug. 31, 1976   3,977,490
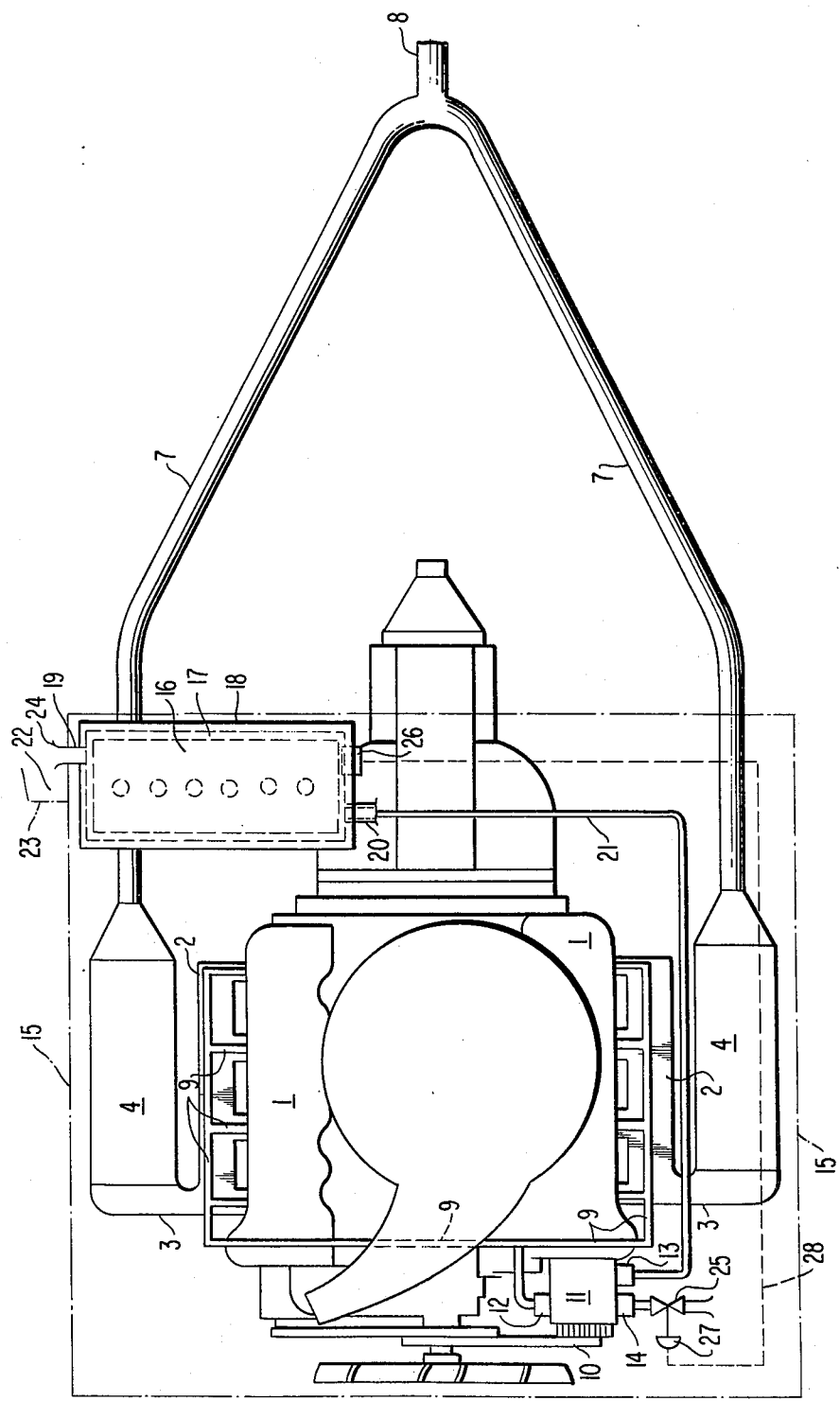

HEAT PROTECTION FOR A VEHICLE ACCUMULATOR

The present invention relates to a motor vehicle driven by an internal combustion engine with an electrical accumulator arranged in the engine space and with an air pump for blowing-in air during the after-treatment of the engine exhaust gases.

Engines with exhaust gas after-treatment develop a very strong heat and do so more particularly when the installations for this after-treatment are arranged in the engine space, whereby the heat stems from and originates at these installations. This heat results in a non-permissive strong heating of vehicle accumulators--so--called batteries--which are also arranged in the engine space. Such an overheating is also enhanced above all in that in engines with exhaust gas after-treatment and with an accumulator arranged in the engine space, the engine space is packed or filled-out very tightly and the aerodynamic air stream can pass only relatively slowly between the individual aggregates; the cooling of the aerodynamic air flow is then only very slight. However, battery overheating significantly decrease the length of life thereof.

It is the aim of the present invention to provide a heat protection for the vehicle accumulator which is not only as simple as possible but also as effective as possible. The underlying problems are solved according to the present invention in that the accumulator is encapsulated on all sides by a protective housing of preferably thermally slightly conductive and/or heat-radiation-preventing material which leaves an intermediate air space with respect to the accumulator housing, and in the two line connections are provided at the protective housing which are spaced apart from one another as far as possible from a flow point of view and in the one line connection is connected with the suction connection of the air pump and the other line connection with a protected place in the motor vehicle which is disposed during operation at least approximately at ambient temperature.

A large amount of heat is already kept away from the accumulator by the encapsulation thereof. However, as a result of the continuous air renewal of the air cushion between the encapsulation and the accumulator, the accumulator is practically kept constantly at the outside temperature or slightly above the same.

During winter operation, the encapsulation alone may suffice for a sufficient heat protection so that the air renewal not only is dispensable but may even be undesirable with a view toward a rapid warm-up of the accumulator to its operating temperature. It is therefore appropriate if a second selectively closable suction connection is arranged at the pump. The air supplied by the pump may be sucked in through this auxiliary inlet past or in by-passing relationship to the encapsulation so that the air in the encapsulation itself at least approximately stagnates.

In order not to permit the danger of an accumulator overheating to arise due to inattention or inadvertence during local or daily transition to warmer outside temperatures, it is advantageous if the variable connection at the further suction connection is actuated according to the indication of a temperature sensor at the accumulator in such a manner that with a cold accumulator the further suction connection is open and with an accumulator at operating temperature, it is closed.

Accordingly it is an object of the present invention to provide a heat protection for a vehicle accumulator which avoids by simple means the aforementioned shortcomings and drawbacks encountered in the prior art.

Another object of the present invention resides in a heat protection for a vehicle accumulator which protects the accumulator against excessive heat, particularly when the accumulator is arranged in the engine space of a motor vehicle equipped with exhaust gas after-treatment devices also located within the engine space.

A further object of the present invention resides in a heat protection for a vehicle accumulator which assures optimum operating temperatures for the accumulator notwithstanding the fact that it is located in a fully packed engine compartment of an internal combustion engine equipped with exhaust gas after-treatment installations.

Still a further object of the present invention resides in a heat-protection system for a motor vehicle battery which effectively extends the length of life thereof notwithstanding its location within an overcrowded engine compartment accommodating exhaust-gas after treatment devices.

A further object of the present invention resides in a heat protection system for the accumulator of a motor vehicle which keeps the accumulator at least approximately constantly at the outside temperature or only slightly thereabove.

Still another object of the present invention resides in a heat protection system for engine accumulators which precludes damage to the accumulator as a result of overheating due to inadvertence on the part of the driver.

These and further objects, features and advantages of the present invention will become more apparent from the following description when taken in connection with the accompanying drawing, which shows, for purposes of illustration only, one embodiment in accordance with the present invention, and wherein: The single FIGURE is a schematic plan view of a vehicle engine with an exhaust gas after-treatment system and with a schematically indicated engine space as well as the heat protection for the accumulator in accordance with the present invention which is arranged in the engine space.

Referring now to the single FIGURE of the drawing, the internal combustion engine illustrated in the illustrated embodiment is a V-engine with two cylinder rows 1 arranged V-shaped to one another, with one exhaust gas manifold 2 each and with one exhaust gas after-treatment installation 4 each which is connected with the exhaust gas manifold 2 by way of a respective line section 3. The exhaust gas after-treatment installation 4 of a respective cylinder row 1 is in communication by way of the respective exhaust gas line 7 with the common exhaust line 8.

During operation the exhaust gas lines and the after-treatment installations develop a large amount of heat and additionally extensively fill out existing spaces in the engine space 15. Air for the exhaust gas after-treatment is blown-in or injected by way of the injection line 9 into the exhaust gas connecting pipe coming directly from each working cylinder (not individually illustrated). The air pressure necessary therefor and the corresponding feed volume is produced by the air pump 11 driven from the engine by way of V-belts 10, which includes a pressure connection 12 and in the illustrated embodiment two suction connections 13 and 14.

The electrical accumulator 16—the so-called battery—is also arranged on the inside of the engine space (schematically indicated by the dash and dot line 15) which feeds the electrical loads of the engine and of the vehicle. For the protection against the heat originating from the exhaust gas lines and after-treatment installations arranged at a slight distance, the battery is encapsulated on all sides by a heat-protective housing 18, leaving on all sides an intermediate air space 17 forming a heat-insulating air cushion. The material of this housing may possess, by suitable material selection and/or by suitable material lamination, a large resistance against heat conduction and against heat radiation. The protective housing 18 includes two line connections 19 and 20 disposed mutually diametrically opposite one another and terminating in the intermediate air space 17. These line connections 19 and 20 permit a continuous air renewal of the air cushion 17 whereby the heat quantity which still penetrates through the heat protective housing 18, can be removed from the battery surroundings. According to the present invention, this air exchange is effected in that the heat-protective housing 18 on the one hand, i.e., the connection 20 is connected to the one suction connection 13 of the air pump 11 by way of a suction line 21 and on the other, the connection 19 is connected with a protected place 22 of the vehicle which during the operation is disposed at least approximately at the outside temperature. This is to be indicated schematically by the suction mouth 24 disposed within the protection of the shield 23.

In order to enable a rapid warm-up of the battery 16 to its operating temperature on cold days or in cold regions, the constant air renewal of the air cushion 17 can also be turned off in that the air suction side of the pump 11 takes place by way of the suction connection 14 terminating directly in the engine space 15. In order to be able to shift to this suction connection 14, a throttle valve 25 is arranged therein which is adapted to be closed. By opening this valve 25, the suction air flows through the suction path 14 which now possesses a considerably smaller flow resistance and not over the long suction path 13, 21, 20, 17, 19, 22, through the protective housing 18. A heat-sensor 26 is arranged at the protective housing 18 which is operatively connected with the actuating member 27 of the throttle valve 25 by way of the operative connection 28. This operative connection 28 is such that when the battery temperature exceeds the optimum battery temperature, the throttle valve 25 is closed (additional battery cooling), however, when the actual battery temperature drops below the optimum warm-up thereof, this throttle valve 25 is again opened (limitation of the battery cooling).

It is also feasible within the scope of the present invention to effect a rapid warm-up of the battery to the operating temperature in vehicles which are used in particular low temperatures or are started at least in particular low temperatures (so-called street light parkers) in that additionally an air inlet is provided at the battery encapsulation which is adapted to be closed at will or according to the indication of a temperature sensor which terminates in the engine space or even in proximity of hot exhaust gas line sections.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A motor vehicle driven by an internal combustion engine which includes an electric accumulator means arranged in the engine space and an air pump means having a suction connection means for blowing-in air during after-treatment of the engine exhaust gases, wherein the accumulator means is substantially encapsulated by a protective housing means, two line connection means are provided at the protective housing means which are disposed relatively far from one another in the flow direction, one line connection means is operatively connected with the suction connection of the air pump means while the other line connection means is operatively connected with a place in the motor vehicle which is protected and is disposed during operation at least approximately at the outside temperature, the protective housing means encapsulates the accumulator means on all sides and leaves an intermediate air space with respect to the accumulator housing, and a second suction connection is arranged at the pump means and is selectively closable.

2. A motor vehicle according to claim 1, wherein the second suction connection means is selectively closable by a throttle valve.

3. A motor vehicle according to claim 1, wherein the selectively closable suction connection means is actuated in dependence on a temperature sensor at the accumulator means in such a manner that with a cold accumulator means the further suction connection means is substantially open and is closed with the accumulator means at least near its operating temperature.

4. A motor vehicle according to claim 3, including means for providing a rapid warm-up of the accumulator means including a selectively closable air inlet line means operatively connected with the protective housing means and terminating within a relatively warm area of the engine space.

5. A motor vehicle according to claim 4, wherein the protective housing means consists of a material with slight heat-conductive properties.

6. A motor vehicle according to claim 4, wherein the protective housing means consists of a heat-radiating-preventing material.

7. A motor vehicle driven by an internal combustion engine which includes an electric accumulator means arranged in the engine space and an air pump means haivng a suction connection means for blowing-in air during after-treatment of the engine exhaust gases, wherein the accumulator means is substantially encapsulated by a protective housing means, two line connection means are provided at the protective housing means which are disposed relatively far from one another in the flow direction, one line connection means is operatively connected with the suction connection of the air pump means while the other line connection means is operatively connected with a place in the motor vehicle which is protected and is disposed during operation at least approximately at the outside temperature, and a second suction connection is arranged at the pump means and is selectively closable.

8. A motor vehicle according to claim 7, wherein the second suction connection means is selectively closable by a throttle valve.

9. A motor vehicle according to claim 7, wherein the selectively closable suction connection means is actuated in dependence on a temperature sensor at the accumulator means in such a manner that with a cold accumulator means the further suction connection means is substantially open and is closed with the accumulator means at least near its operating temperature.

10. A motor vehicle according to claim 7, including means for providing a rapid warm-up of the accumulator means including a selectively closable air inlet line means operatively connected with the protective housing means and terminating within a relatively warm area of the engine space.

11. A motor vehicle according to claim 10, wherein the protective housing means encapsulates the accumulator means on all sides and leaves an intermediate air space with respect to the accumulator housing.

12. A motor vehicle according to claim 11, wherein the protective housing means consists of a material with slight heat-conductive properties.

13. A motor vehicle according to claim 12, wherein the protective housing means consists of a heat-radiating-preventing material.

* * * * *